(12) United States Patent
Fujisaki et al.

(10) Patent No.: US 6,211,640 B1
(45) Date of Patent: Apr. 3, 2001

(54) MOTOR DRIVE CONTROL SYSTEM

(75) Inventors: Yoshihiro Fujisaki; Shinichi Emura, both of Osaka-fu (JP)

(73) Assignee: Matsushita Electric Industrial Co., Ltd., Osaka-Fu (JP)

(*) Notice: Subject to any disclaimer, the term of this patent is extended or adjusted under 35 U.S.C. 154(b) by 0 days.

(21) Appl. No.: 09/473,942

(22) Filed: Dec. 29, 1999

(30) Foreign Application Priority Data

Mar. 23, 1999 (JP) .................................................. 11-077415

(51) Int. Cl.⁷ .................................................. G05B 21/02
(52) U.S. Cl. ..................... 318/636; 318/268; 318/163; 318/66; 318/700; 318/432; 318/799; 318/254; 388/800
(58) Field of Search ..................... 318/636, 268, 318/163, 66, 98, 700, 432, 727, 799, 798, 254; 388/800, 805, 806, 812–815, 820, 823

(56) References Cited

U.S. PATENT DOCUMENTS

| | | | |
|---|---|---|---|
| 5,155,422 | * 10/1992 | Sidman et al. | 318/560 |
| 5,155,797 | * 10/1992 | Nomura et al. | 388/815 |
| 5,545,988 | * 8/1996 | Sakai et al. | 324/212 |
| 5,729,113 | * 3/1998 | Jansen et al. | 318/799 |
| 5,909,333 | * 6/1999 | Best et al. | 360/51 |

FOREIGN PATENT DOCUMENTS

5346813  12/1993  (JP) .

OTHER PUBLICATIONS

An English Language abstract of JP 5,346,813.

* cited by examiner

*Primary Examiner*—Robert E. Nappi
*Assistant Examiner*—Edgard San Martin
(74) *Attorney, Agent, or Firm*—Greenblum & Bernstein, P.L.C.

(57) ABSTRACT

A motor control unit (1) includes a white noise generator (8), an instruction switch (9) for switching between an input control instruction (Vins) and a white noise output of the white noise generator (8), a controller (10) for feedback controlling the motor drive velocity, a detection unit (13) for detecting and sampling the real velocity of a motor or a load at a predetermined period, a first Fourier transformer (15) for Fourier-transforming the control instruction data (Cins) together with the sampled velocity data (Vm), and a first frequency characteristic operation unit (16) for calculating the frequency characteristics in a range from the velocity instruction (Cins) to the sampled velocity (Vm) based on output data of the first Fourier transformer (15), thus obtaining the frequency characteristics in a short period without necessity of a servo-analyzer.

11 Claims, 11 Drawing Sheets

MOTOR DRIVE CONTROL SYSTEM

BACKGROUND OF THE INVENTION

1. Field of the Invention

The present invention generally relates to a control system for a motor, and in particular to a motor drive control system having a function of measuring frequency characteristics of the motor.

2. Description of the Prior Art

In recent years, it has been widely practiced to obtain frequency characteristics of a motor with a load mechanically connected thereto for the purposes of analyzing a mechanical resonance which may cause degradation in operation performance, analyzing response characteristics and stability of control, and the like. In this description, it is noted that the term "frequency characteristics" refers to characteristics in a graph representing a relationship of a gain or phase to a frequency. The term "frequency-response characteristics" refers to the frequency characteristics of a real motion to a drive instruction where the real motion is outputted by a control object based on the input instruction via a control gain to form a feedback control loop. The term "velocity-instruction response characteristics" refers to the frequency-response characteristics in the case where the input instruction is a velocity instruction.

Conventionally, in order to measure frequency characteristics of a motor in a motor drive control system, there has been used a construction of a feedback control loop, for example, as shown in FIG. 12. Referring to FIG. 12, a motor drive unit 1 receives an input drive control instruction signal (referred to as "input instruction signal" hereinafter) and drives a motor 3 and a load 4 under control in accordance with the input instruction signal. The load 4 is mechanically connected to the motor by a driving shaft of the motor. As an input instruction signal, a velocity instruction signal Vins or a position instruction signal Pins is generally used. In this example of FIG. 12, the conventional construction is referred to a case where a velocity instruction Vins is used.

A servo-analyzer 5, which includes therein an oscillator (not shown) for generating a sine wave signal, is connected to the motor drive unit 1 so that the sine wave signal output of the servo-analyzer 5 is applied to the motor drive unit 1, serving as the velocity instruction Vins. The servo-analyzer 5 is also connected with a velocity detector 6 attached to the motor for detecting a real rotational velocity (referred t as "real motor velocity" hereinafter) Vr of the motor 3 so that the servo-analyzer 5 receives the real motor velocity Vr detected by the velocity detector 6.

With this construction, the servo-analyzer 5 outputs a sine wave signal serving as the velocity instruction Vins. The motor drive unit 1 receives the velocity instruction Vins and drives the motor 3 and the load 4 under control in accordance with the velocity instruction Vins. Therefore, the real motor velocity Vr is in a motion of a sine wave form in accordance with the velocity instruction Vins as shown in FIG. 13.

In the wave form comparison shown in FIG. 13, the servo-analyzer 5 detects a gain which is an amplitude ratio of the velocity instruction Vins to the real motor velocity Vr and a phase difference between the velocity instruction Vins and the real motor velocity Vr. By continuing the detection of the gain and phase difference while gradually increasing the frequency of the velocity instruction Vins, the frequency characteristics in a range from the velocity instruction Vins to the real motor velocity Vr are obtained. The measurement results of the frequency characteristics are generally represented as a Bode diagram.

In this conventional construction as described above, the servo-analyzer 5 is inherently required as an instrument for measuring the frequency characteristics of the motor. Therefore, in the case where the load 4 of hardware connected to the motor is too large in size and weight to be movable, the servo-analyzer 5 must be moved to the place where the load 4 is installed. In general, however, the servo-analyzer 5 is an instrument which lacks portability, and thus the conventional drive control system is very inconvenient.

Moreover, since the frequency of the velocity instruction Vins is gradually increased from the lowest frequency to the highest frequency in a range of a desired measurement bandwidth, there has been a problem that the measurement time is disadvantageously long. Meanwhile, in order to suppress an influence of a noise and the like to enhance the measurement precision of the frequency characteristics, the amplitude of the velocity instruction Vins must be increased to some desirable degree. If the measurement time is long while the amplitude is kept large, burdens affected on the motor 3 and the load 4 increase, which may in some cases cause overheating breakdown of the motor 3 or breakdown of the hardware load 4.

SUMMARY OF THE INVENTION

The present invention has been developed to solve these problems and has an object to provide a motor drive control system capable of measuring the frequency characteristics of the motor with a load connected thereto in a short time period without necessity of a special instrument such as the servo-analyzer for measuring the frequency characteristics.

In order to achieve the object mentioned above, the present invention provides a motor drive control system in which a motor drive unit receives an input drive control instruction signal to drive a motor and a load connected thereto under controlling the motor drive. The motor drive control system comprises:

a white noise generator generating a white noise;

an instruction selecting unit for selecting one of the input drive control instruction signal for normal control operation and the white noise generated by the white noise generator for frequency characteristic operation, as a control instruction data signal;

a controller controlling a motor drive using the control instruction data signal output of said instruction selecting unit;

a sampling unit sampling data representing a driving state of one of the motor and the load at a predetermined sampling period to generate sampled data;

a first Fourier transformer for Fourier-transforming the control instruction data output of the instruction selecting unit together with the sampled data obtained by said sampling unit; and a first frequency characteristic operation unit for calculating frequency characteristics in a range from the control instruction data to the sampled data based on output data of the first Fourier transformer.

With the above construction, since the construction for calculating the frequency characteristics is included in the motor control unit, no special instrument is required. Moreover, since white noise containing all frequency components in uniform is used as the control instruction signal, it is not necessary to gradually increase the frequency as is required in the conventional system, and thus measurement of the frequency characteristics can be done in a short period.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which:.

DETAILED DESCRIPTION OF THE PREFERRED EMBODIMENTS

Figure 1:
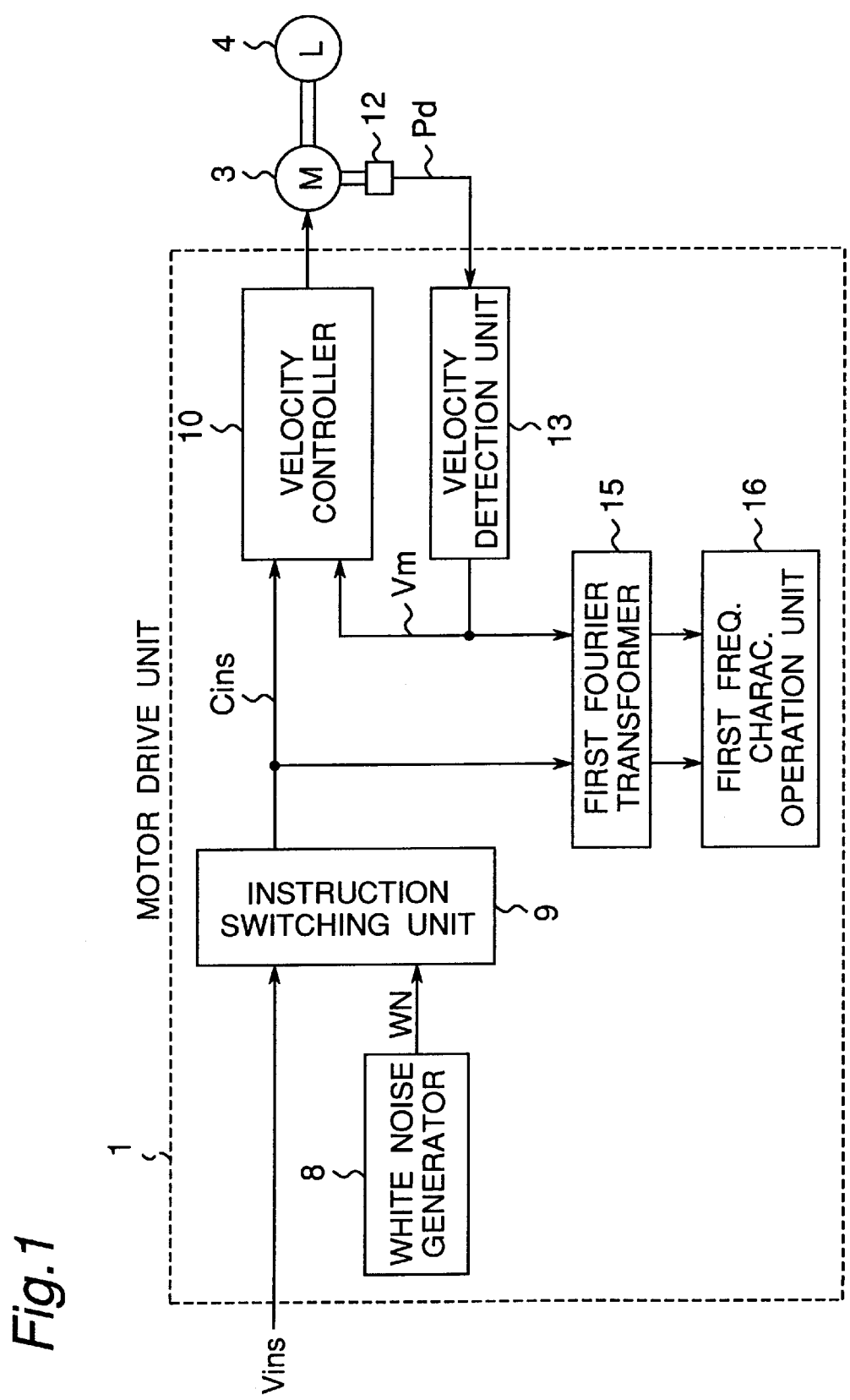
FIG. 1 is a block diagram illustrating the first embodiment of the motor drive control system according to the present invention.

Before the description proceeds, it is to be noted that, since the basic structures of the preferred embodiments are in common, like parts are designated by the same reference numerals throughout the accompanying drawings.
(Embodiment 1)

FIG. 1 shows a block construction of the first embodiment of a motor drive control system according to the present invention. In this construction, a motor drive unit 1 for driving and controlling a motor 3 receives an input instruction signal for motor drive control. As an input instruction signal, a velocity instruction signal Vins or a position instruction signal Pins is generally used. In this embodiment, the construction is referred to the case where the velocity instruction signal Vins is applied to the motor drive unit 1.

The motor drive unit 1 includes a white noise generator 8 generating a white noise WN, a velocity instruction switching unit 9, a velocity controller 10 which includes a compensator having known characteristics for controlling a rotation of the motor, and a velocity detection unit 13 for detecting a real rotational velocity of the motor and sampling the detected velocity of the motor. The motor drive unit 1 further includes a first Fourier transformer 15 and a first frequency characteristic operation unit 16.

In this construction, the velocity instruction switching unit 9 is switched to select between the velocity instruction signal Vins input to the motor drive unit 1 and the white noise signal WN generated by the white noise generator 8, so that the selected instruction signal Vins or WN is used as a control velocity instruction Cins to be applied to the velocity controller 10. The white noise WN generated by the white noise generator 8 contains all frequency components in uniform. In this motor drive control system, the motor 3 is operatively connected with a load 4 of hardware by way of a motor shaft and a coupling mechanism of the load which is driven by the motor 3.

The motor 3 is provided with, for example, a rotary encoder 12 having a pulse generator and the like which serves as a rotational position detecting unit for detecting a rotational position of the motor 3 and generating a rotational position detection signal Pd of the motor. Based on the rotational position detection signal Pd of the motor detected by the rotary encoder 12, the velocity detection unit 13 obtains a real rotational velocity Vr of the motor 3 by including e.g. a differentiator (not shown). Alternatively, the rotary encoder 12 may includes a function of a differentiator to generate the real motor velocity Vr. The velocity detection unit 13 also serves as a velocity sampling means to sample the real motor velocity and generates the sampled velocity data of the motor (referred to as "motor velocity Vm", hereinafter). In this sampling operation of the velocity detection unit 13, as the sampling period of the velocity data is shortened, frequency characteristics in a higher frequency band are obtained.

The velocity controller 10 receives both the control velocity instruction Cins and the motor velocity Vm, setting a control gain value K to control the motor 3 so that the control velocity instruction Cins and the motor velocity Vm match with each other. Thus, the velocity controller 10, motor 3 rotary encoder 12 and velocity detection unit 13 constitutes a velocity feedback control loop.

In the meanwhile, the data of the velocity instruction Cins generated by the instruction switching unit 9 and the motor velocity Vm output of the velocity detection unit 13 are supplied in common to the first Fourier transformer 15 and the resultant outputs thereof are supplied to the first frequency characteristic operation unit 16.

With the above construction, when the motor 3 is normally controlled, the instruction switching unit 9 is so switched as to select the input velocity instruction Vins to be used as the controller velocity instruction Cins for the velocity controller 10. This allows the motor 3 and the load 4 to be operated in accordance with the input velocity instruction Vins.

When an operation mode of the control system is set to measure the frequency characteristics of the motor, in the first step, the instruction switching unit 9 is switched to select the white noise WN generated by the white noise generator 8 so that the white noise is used as the controller velocity instruction Cins to be applied to the velocity controller 10. This allows the motor 3 and the load 4 to be operated in accordance with the white noise WN as the velocity instruction Cins.

In this frequency-characteristic measuring operation, the data of the velocity instruction Cins and the motor velocity Vm in a time domain are transformed to the data in a frequency domain by means of the first Fourier transformer 15. Then, based on the resultant frequency domain data, the first frequency characteristic operation unit 16 calculates a gain and a phase which are used to obtain the frequency characteristics in the range from the velocity instruction Cins to the motor velocity Vm. In other words, the velocity-instruction response characteristics of the motor 3 are obtained based on the gain and the phase difference.

According to the first embodiment, the motor drive unit 1 includes a construction for obtaining the frequency characteristics of the motor, which eliminates the necessity of a special instrument such a servo-analyzer (5) as is required in the conventional method. This makes it possible to remarkably simplify the measurement of the frequency characteristics of the motor 3 with the hardware load 4 mechanically connected thereto.

Moreover, since the white noise WN containing all frequency components in uniform is used as the control velocity instruction, it is not necessary to gradually increase the frequency of the velocity instruction Vins from the lowest frequency to the highest frequency in a range of a desired measurement bandwidth as required in the conventional method, and thus the measurement of the frequency characteristics of the motor can be done in a short time. Therefore, even when the amplitude of the velocity instruction is increased in order to enhance the measurement precision, the burdens affected on the motor 3 and the load 4 can be minimized since the measurement is finished in a short time.

Furthermore, each block component 8, 9, 10, 13, 15 and 16 of the motor drive unit 1 can be easily implemented by software of computer. Thus, advantageously, there is required substantially no cost increase from the conventional construction by realizing the construction by software.

Since it is difficult to some extent to obtain an ideal white noise, an M-sequence signal which is a generally utilized pseudo random signal may be used instead of the white noise, so that the construction of the white noise generator 8 can be simplified. If the uniformity of the frequency components contained in the white noise is sufficiently high, the gain characteristics of the velocity instruction Cins are constant irrespective of the frequency. In this case, therefore, the frequency characteristics can be obtained based on the results of Fourier transform of only the data of the motor velocity Vm irrespective of the frequency of the velocity instruction Cins.

Moreover, in this embodiment shown in FIG. 1, the rotational velocity of the motor 3 is detected by providing the rotary encoder 12 attached to the motor 3. Alternatively, an operation velocity of the load 4 may be detected by attaching a velocity sensor or the like to the load 4. With this construction, the frequency-response characteristics of the load 4 in response to the input velocity instruction Vins can be directly obtained. This is effective since the real behavior of the load 4 is obtained even in the case where a difference arises between the two motions of the motor 3 and the load 4 due to the properties of the coupling mechanism therebetween.

Moreover, the number of data to be transformed by the first Fourier transformer 15 may be a value equal to any of powers of 2. This makes it possible to adopt a generally known high-speed Fourier transform algorithm and thus increase the speed of a series of processing. The highest frequency of the obtained frequency characteristics is determined based on the sampling period of the data of the motor velocity Vm. Accordingly, some results of the frequency characteristics measured by varying the sampling period may be accumulated to obtain the results in a wide band.

(Embodiment 2)

Figure 2:
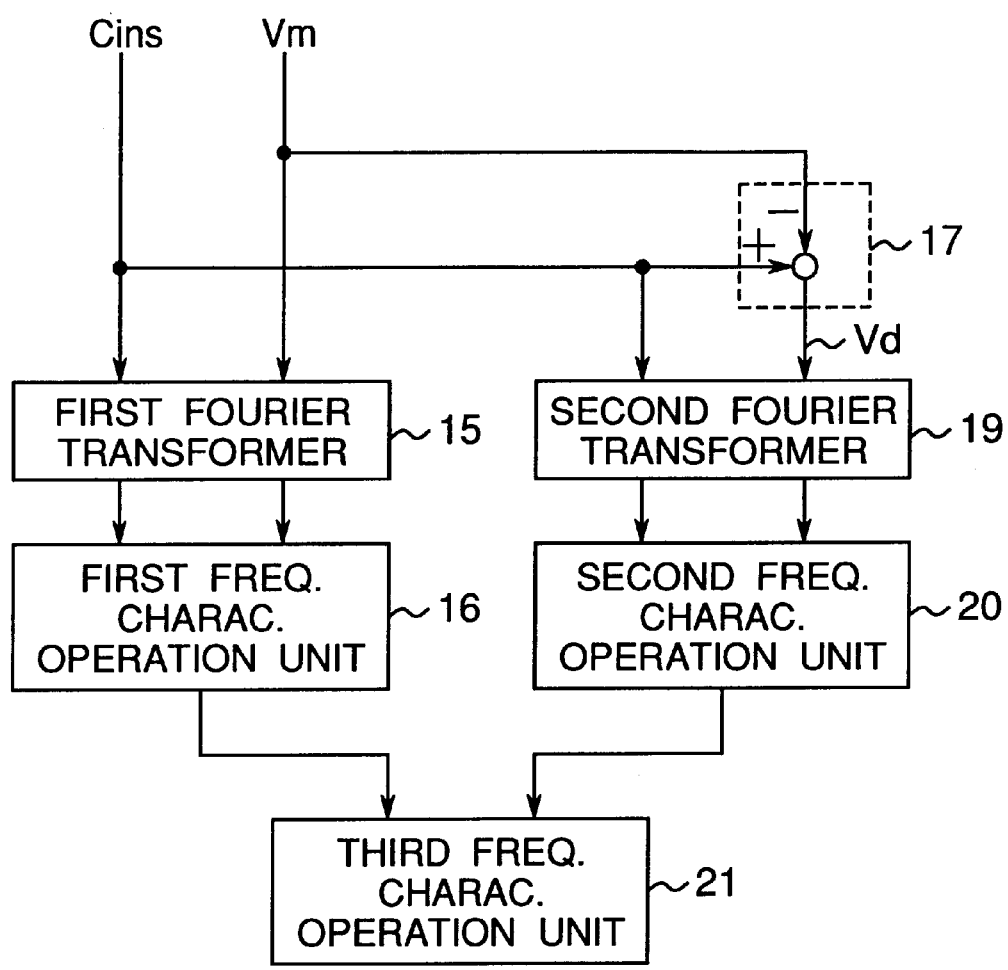
FIG. 2 is a block diagram showing the second embodiment of the motor drive control system according to the present invention.

FIG. 2 shows a block construction of the second embodiment of the present invention, illustrating the process after obtaining the velocity instruction Cins and motor velocity Vm to be used for the Fourier transformation shown in FIG. 1. Similar components designated by reference numerals 1–4, 8–10, and 13 common with FIG. 1 are omitted in this figure for brevity, except for the first Fourier transformer 15 and the first frequency characteristic operation unit 16 for clarifying the description.

In this construction of the second embodiment, the difference from the first embodiment resides in the fact that the motor drive unit 1 further includes a velocity deviation operation unit 17, a second Fourier transformer 19, a second frequency characteristic operation unit 20 and a third frequency characteristic operation unit 21.

The velocity deviation operation unit 17 calculates a difference between the velocity instruction Cins and the motor velocity Vm to output a velocity deviation Vd. The velocity instruction Cins and the velocity deviation Vd are supplied in common to the second frequency characteristic operation unit 20 via the second Fourier transformer 19. Then, the output of the first frequency characteristics operation unit 16 and the output of the second frequency characteristic operation unit 20 are supplied in common to the third frequency characteristic operation unit 21.

With the above construction, in the operation when the frequency characteristics of the motor are to be measured, the process is the same as that in the first embodiment where the motor 3 and the load 4 are driven using the white noise WN as the control velocity instruction Cins and that the first frequency characteristic operation unit 16 calculates the frequency characteristics in a range from the velocity instruction Cins to the motor velocity Vm.

In this second embodiment, in addition to the process of the first embodiment, the data of the velocity instruction Cins and the velocity deviation Vd in a time domain are transformed to the data in a frequency domain by means of the second Fourier transformer 19. Thereafter, based on the resultant transformed data in the frequency domain, the second frequency characteristic operation unit 20 calculates a gain and a phase which are used to obtain the frequency characteristics in a range from the velocity instruction Cins to the velocity deviation Vd.

The third frequency characteristic operation unit 21 calculates gain characteristics in a range from the velocity deviation Vd to the motor velocity Vm, i.e., gain characteristics of a loop transfer function under velocity control, by dividing the gain obtained by the first frequency characteristic operation unit 16 by the gain obtained by the second frequency characteristic operation unit 20.

Likewise, the third frequency characteristic operation unit 21 obtains phase characteristics of a loop transfer function under velocity control by calculating a difference between the phase obtained by the first frequency characteristic operation unit 16 and the phase obtained by the second frequency characteristic operation unit 20.

According to the second embodiment, the frequency characteristics of a loop transfer function under velocity control can be obtained by only adding to the constructions of the first embodiment the components of the velocity deviation operation unit 17, second Fourier transformer 19, second frequency characteristic operation unit 20 and third frequency characteristic operation unit 21. The frequency characteristics of the loop transfer function can be utilized in determining stability of the velocity feedback control performed by the velocity controller 10.

Moreover, since the characteristics of the compensator included in the velocity controller 10 are known, the transfer functions of the motor 3 and the load 4 can be easily obtained from the loop transfer function, allowing for detailed examination of resonance characteristics of the load 4 and the like. In general, when examination of the transfer characteristics of the load 4 is attempted, a method is often employed where the velocity is detected by issuing an instruction for a torque applied to the motor 3. In this case, however, the velocities of the motor 3 and the load 4 are not fixed since they are not controlled, causing a problem in safety. On the contrary, in the present embodiment, high safety is secured since the measurement of the transfer characteristics is performed in a velocity-controlled state.

In this embodiment, it is noted here that, although the description is made in the case where the velocity control instruction signal is used, it is equivalent to the case of using a position control instruction signal by employing a position deviation operation unit instead of the velocity deviation operation unit 17. In this case, the frequency characteristics of a loop transfer function under position control can be obtained.

(Embodiment 3)

Figure 3:
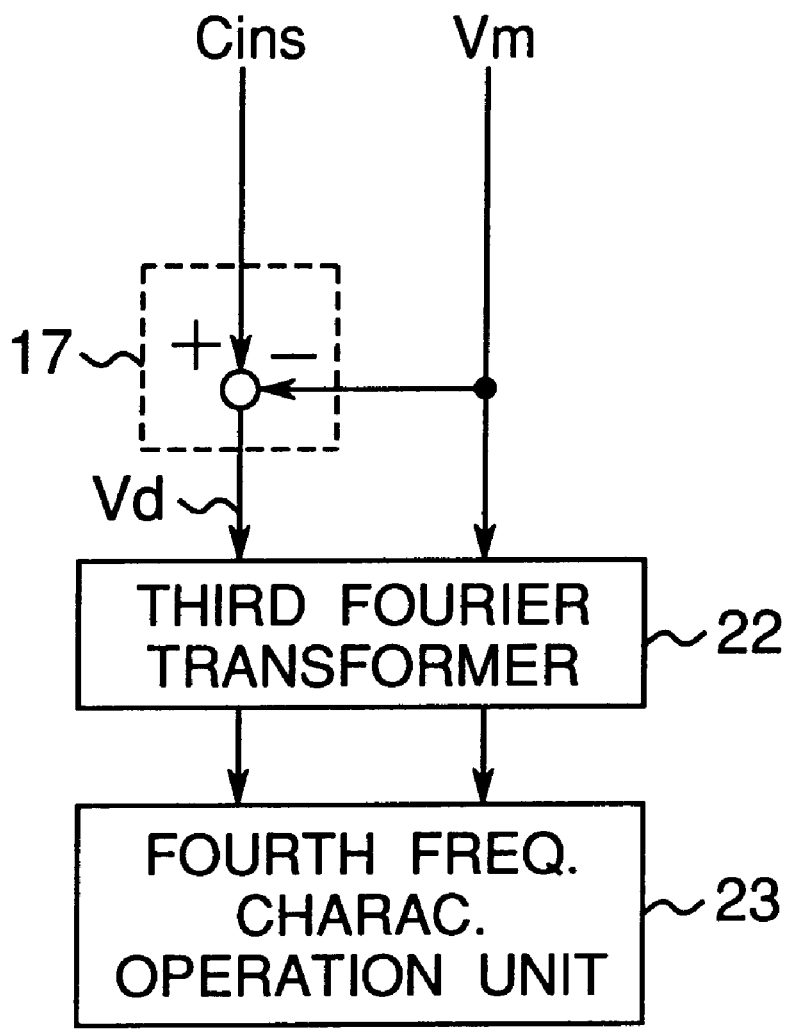
FIG. 3 is a block diagram showing the third embodiment of the motor drive control system according to the present invention.

FIG. 3 shows a block construction of the third embodiment of the present invention, illustrating the process after obtaining the velocity instruction Cins and the motor velocity Vm shown in FIG. 1. Similar components designated by reference numerals 1–4, 8–10, and 13 common with FIG. 1 are omitted in this figure for brevity. The velocity deviation operation unit 17 calculates a difference between the velocity instruction Cins and the motor velocity Vm to output a velocity deviation Vd as is similar to that of the second embodiment. In this case, data of the velocity deviation Vd and the motor velocity Vm are supplied in common to a fourth frequency characteristic operation unit 23 via a third Fourier transformer 22 instead of the first Fourier transformer 15 and first frequency characteristic operation unit 16.

With the above construction, when the frequency characteristics are to be measured, the motor 3 and the load 4 are operated using the white noise WN selected as the velocity instruction Cins. Simultaneously, data of the velocity deviation Vd and the motor velocity Vm in a time domain are transformed to data in a frequency domain by the third Fourier transformer 22, and further, based on the above transformed data in the frequency domain, the fourth frequency characteristic operation unit 23 calculates frequency characteristics in a range from the velocity deviation Vd to the motor velocity Vm. In other words, the frequency characteristics of a loop transfer function under velocity control is obtained.

According to this embodiment, the frequency characteristics of a loop transfer function can be obtained by a construction simpler than that of the second embodiment.

In this embodiment, it is noted here that, although the description is made in the case where the velocity control instruction signal is used, it is equivalent to the case of using a position control instruction signal by employing a position deviation operation unit instead of the velocity deviation operation unit 17. In this case, the frequency characteristics of a loop transfer function under position control can be obtained.

(Embodiment 4)

Figure 4:
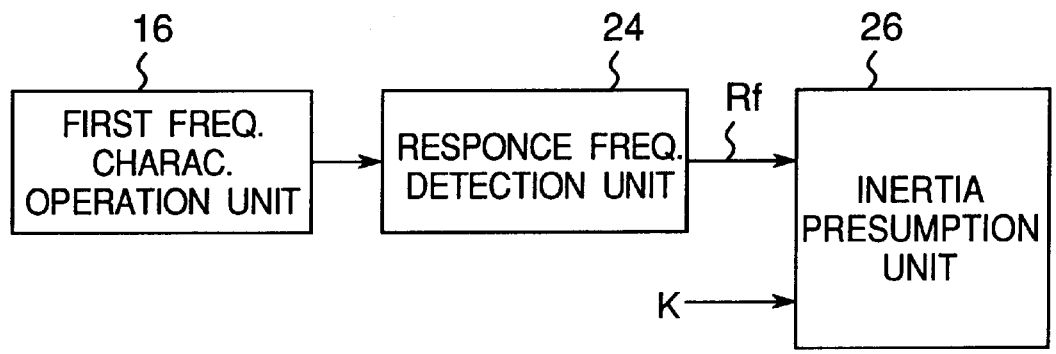
FIG. 4 is a block diagram showing the fourth embodiment of the motor drive control system according to the present invention.

FIG. 4 shows a block construction of the fourth embodiment of the present invention, illustrating the processing subsequent to the processing made by the first frequency characteristic operation unit 16 shown in FIG. 1. In this embodiment, a response frequency detection means 24 and an inertia presumption means 26 are added to the construction of the first embodiment. The other portions are common with those of the first embodiment shown in FIG. 1 and thus omitted here for brevity.

In this construction, the frequency characteristics Fc obtained by the first frequency characteristic operation unit 16 are supplied to the response frequency detection unit 24 to detect a response frequency Rf. The detected response frequency Rf, as well as a control gain value K generated by the velocity controller 10, are then supplied to the inertia presumption unit 26.

Figure 5:
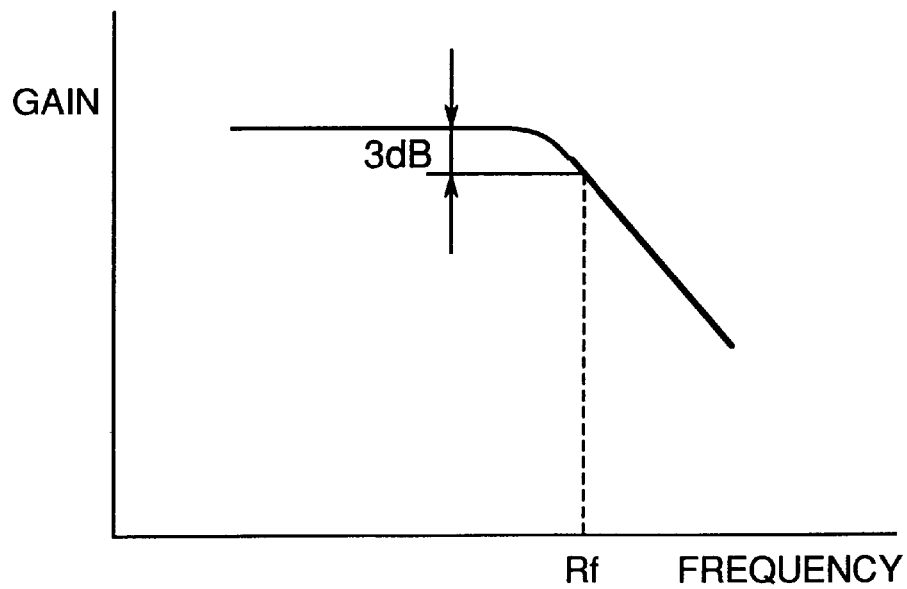
FIG. 5 is a Bode diagram showing the operation in the fourth embodiment.

Based on the velocity instruction response characteristics Fc of the motor 3 obtained by the first frequency characteristic operation unit 16, the response frequency detection unit 24 detects a frequency of which gain characteristics decrease by 3 dB as shown in FIG. 5 for use as the response frequency Rf. The inertia presumption unit 26 calculates an inertia of the motor 3 and that of the load 4 based on the response frequency Rf and the control gain value K.

Figure 6:
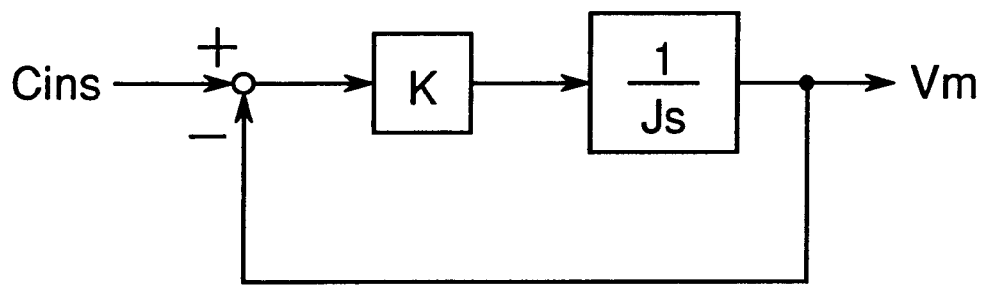
FIG. 6 is a block diagram showing a feedback control loop in the fourth embodiment.

FIG. 6 shows a block construction of the velocity feedback control loop including the velocity controller 10 and the like, wherein K denotes the control gain value, J denotes a total value of the inertia of the motor 3 and the load 4, and s denotes a Laplacian. The transfer function in the range from the velocity instruction Cins to the motor velocity Vm of this block diagram represents primary delay characteristics with a time constant of J/K. Therefore, the response frequency Rf can be expressed by K/J which is a reciprocal of the time constant. In this relationship, the inertia J can be obtained by dividing the control gain value K by the response frequency Rf. The inertia presumption unit 26 presumes the total value of the inertia of the motor 3 and the load 4 by executing this operation.

According to the fourth embodiment described above, the inertia of the motor 3 and that of the load 4, which are important parameters in the control system, can be easily presumed. By presuming the inertia values, the control gain value for obtaining desired response characteristics is determined. It is therefore possible to automatically set the control gain K of the velocity controller 10.

(Embodiment 5)

Figure 7:
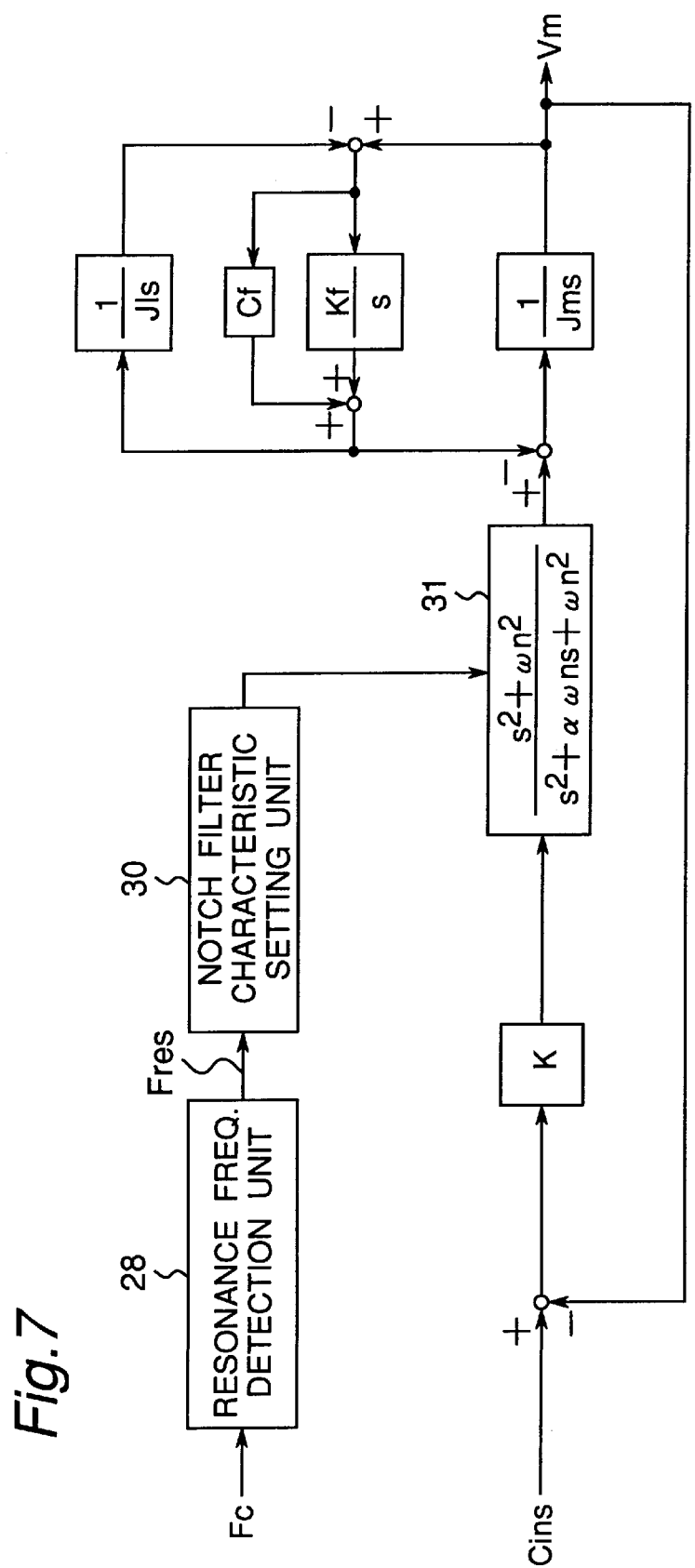
FIG. 7 is a block diagram showing a feedback control loop in the fifth embodiment.

FIG. 7 shows a block construction of the fifth embodiment of the present invention, illustrating a velocity feedback control loop comprised of the velocity controller 10 and the like, which is different from that of the fourth embodiment shown in FIG. 6. This embodiment shows the case where the coupling mechanism for the motor 3 and the load 4 has a low rigidity with a resonance.

In FIG. 7, frequency characteristics Fc represent the velocity instruction response characteristics obtained by the construction of the first embodiment or the loop transfer characteristics under velocity control obtained by the constructions of the second and third embodiments. The frequency characteristics Fc is supplied to a resonance frequency detection unit 28 to detect a resonance frequency Fres, and the detected resonance frequency Fres is then supplied to a notch filter characteristic setting unit 30.

In this construction, Jm denotes the inertia of the motor 3, Jl denotes the inertia of the load 4, Kf denotes a spring constant and Cf denotes a viscous friction coefficient of the coupling mechanism, and s denotes a Laplacian. A notch filter 31 is inserted downstream of the block component of the control gain value K, and the characteristics of the notch filter 31 are set by the notch filter characteristics setting unit 30, wherein ωn denotes a notch frequency and α denotes a parameter for determining the notch width.

Figure 8A:
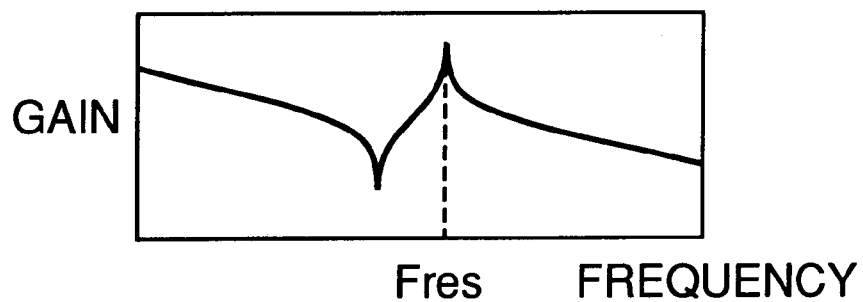
FIGS. 8A and 8B are Bode diagrams showing the operation in the fifth embodiment.
Figure 8B:
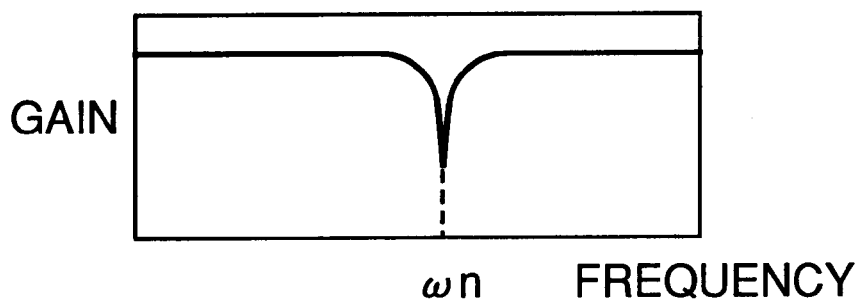

The resonance frequency detection unit 28 detects a peak frequency as a resonance frequency Fres at which a tilt of the gain characteristics abruptly changes from positive to negative as shown in FIG. 8A. The notch filter characteristics setting unit 30 sets the characteristics of the notch filter 31 so that the notch frequency ωn substantially matches with the resonance frequency Fres as shown in FIG. 8B. This eliminates a frequency component which may excite the resonance from a torque driving the motor 3, resulting in suppressing the resonance.

According to this embodiment, the resonance can be suppressed by automatically setting the characteristics of the notch filter so as to match with the detected resonance characteristics of the motor 3 and the load 4.

Alternatively, the resonance frequency Fres may be detected by utilizing an abrupt change of the phase characteristics. Further, the resonance suppression effect may be enhanced by setting not only the notch frequency but also the notch width of the characteristics of the notch filter 31 so as to match with the obtained resonance characteristics.

(Embodiment 6)

Figure 9:
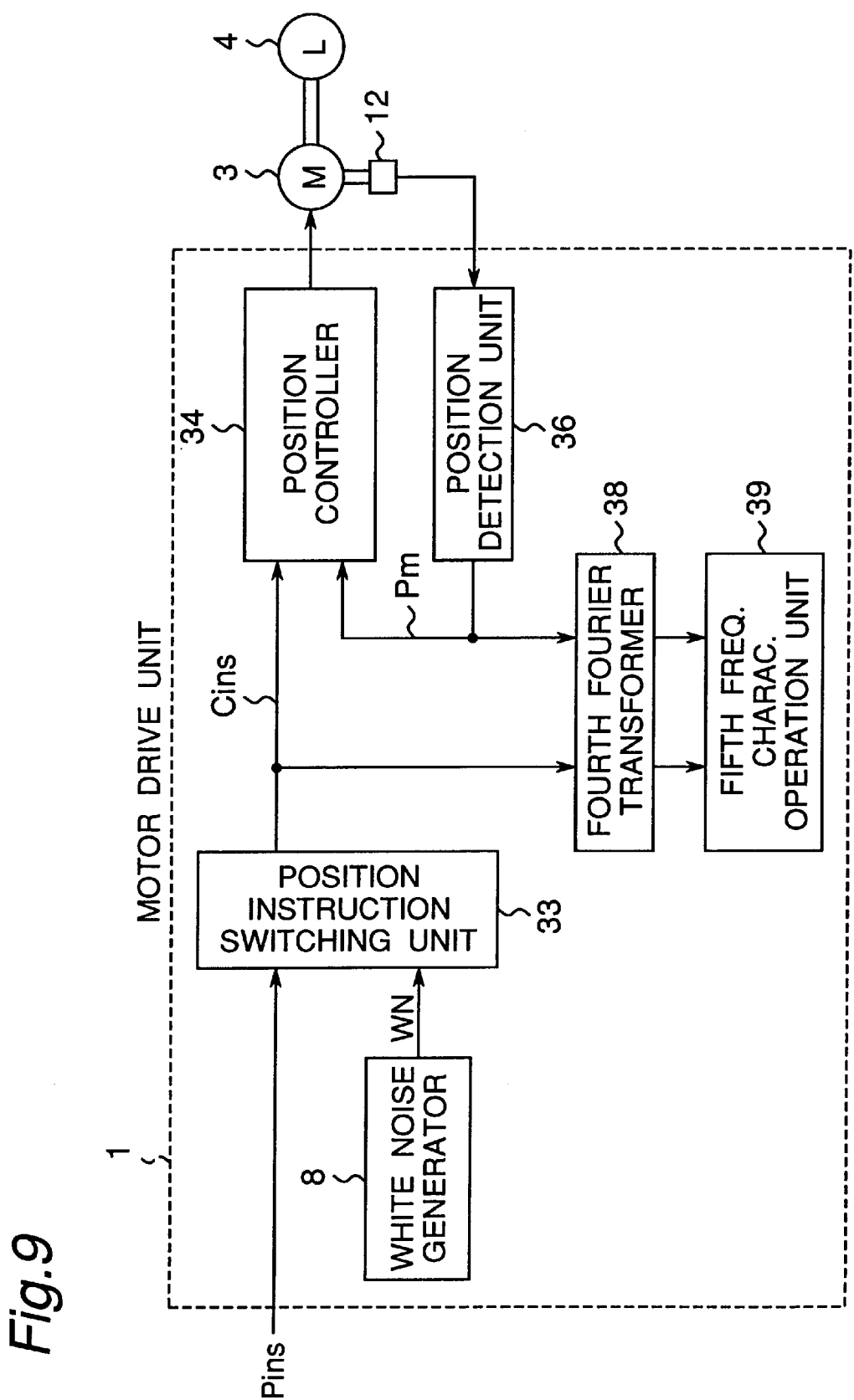
FIG. 9 is a block diagram showing the sixth embodiment of the motor drive control system according to the present invention.

FIG. 9 shows a block construction of the sixth embodiment of the present invention. In this construction, a motor drive unit 1 receives an input position instruction signal Pins instead of the velocity instruction signal Vins used in the first embodiment. The motor drive unit 1 includes a position instruction switching unit 33, a position controller 34, and a position detection unit 36 for detecting a real rotational position of the motor, and further includes a fourth Fourier transformer 38 and a fifth frequency characteristic operation unit 39. The other constitution of the motor drive unit 1 is similar to that of the first embodiment.

In this construction, the instruction switching unit 33 selects one of the position instruction signal Pins and the white noise signal WN generated by the white noise generator 8, so that the selected instruction signal Pins or WN is used as a controller velocity instruction Cins to be applied to the position controller 34. Based on the rotational position detection signal Pd of the motor detected by the rotary encoder 12, the position detection unit 36 samples a real rotational position Pm of the motor 3 (referred to as "motor position Pm", hereinafter). The position controller 34 controls the motor 3 so that the controller position instruction Cins and the motor position Pm match with each other. Thus, the position controller 34, motor 3, rotary encoder 12 and position detection unit 36 constitutes a position feedback control loop.

In the meanwhile, the data of the position instruction Cins selected by the instruction switching unit 33 and the motor position Pm output of the position detection unit 36 are supplied in common to the fourth Fourier transformer 38 and the resultant outputs thereof are supplied to the fifth frequency characteristic operation unit 39.

When the motor 3 is normally controlled, the instruction switching unit 33 is so switched as to select the input position instruction Pins to be used as the controller position instruction Cins for the position controller 34. This allows the motor 3 and the load 4 to be operated in accordance with the input position instruction Pins.

When an operation mode of the control system is set to obtain the frequency characteristics of the motor, in the first step, the instruction switching unit 33 is switched to select the white noise WN generated by the white noise generator 8 so that the white noise is used as the controller position instruction Cins to be applied to the position controller 34. This allows the motor 3 and the load 4 to be operated in accordance with the white noise WN as the position instruction Cins.

In this frequency-characteristic measuring operation, the data of the position instruction Cins and the motor position Pm in a time domain are transformed to the data in a frequency domain by means of the fourth Fourier transformer 38. Then, based on the resultant frequency domain data, the fifth frequency characteristic operation unit 39 calculates a gain and a phase which are used to obtain the frequency characteristics in the range from the position instruction Cins to the motor position Pm. In other words, the position-instruction response characteristics of the motor 3 are obtained based on the gain and the phase difference.

According to the sixth embodiment, the motor drive unit 1 includes a construction for obtaining the frequency characteristics of the motor, which eliminates the necessity of a special instrument such a servo-analyzer (5) as is required in the conventional method. This makes it possible to remarkably simplify the measurement of the frequency characteristics of the motor 3 with the hardware load 4 mechanically connected thereto.

Moreover, since the white noise WN containing all frequency components in uniform is used as the control velocity instruction, the measurement of the frequency characteristics of the motor can be done in a short time, similarly to the first embodiment. Therefore, even when the amplitude of the velocity instruction is increased in order to enhance the measurement precision, the burdens affected on the motor 3 and the load 4 can be minimized since the measurement is finished in a short time.

Furthermore, each block component of the motor drive unit 1 can be easily implemented by software of computer. Thus, advantageously, there is required substantially no cost increase from the conventional construction by realizing the construction by software.

Alternatively, an operation position of the load 4 may be detected by attaching a position sensor or the like to the load 4. With this construction, the frequency-response characteristics of the load 4 in response to the input position instruction Pins can be directly obtained. This is effective since the real behavior of the load 4 is obtained even in the case where a difference arises between the two motions of the motor 3 and the load 4 due to the properties of the coupling mechanism therebetween.

(Embodiment 7)

Figure 10:
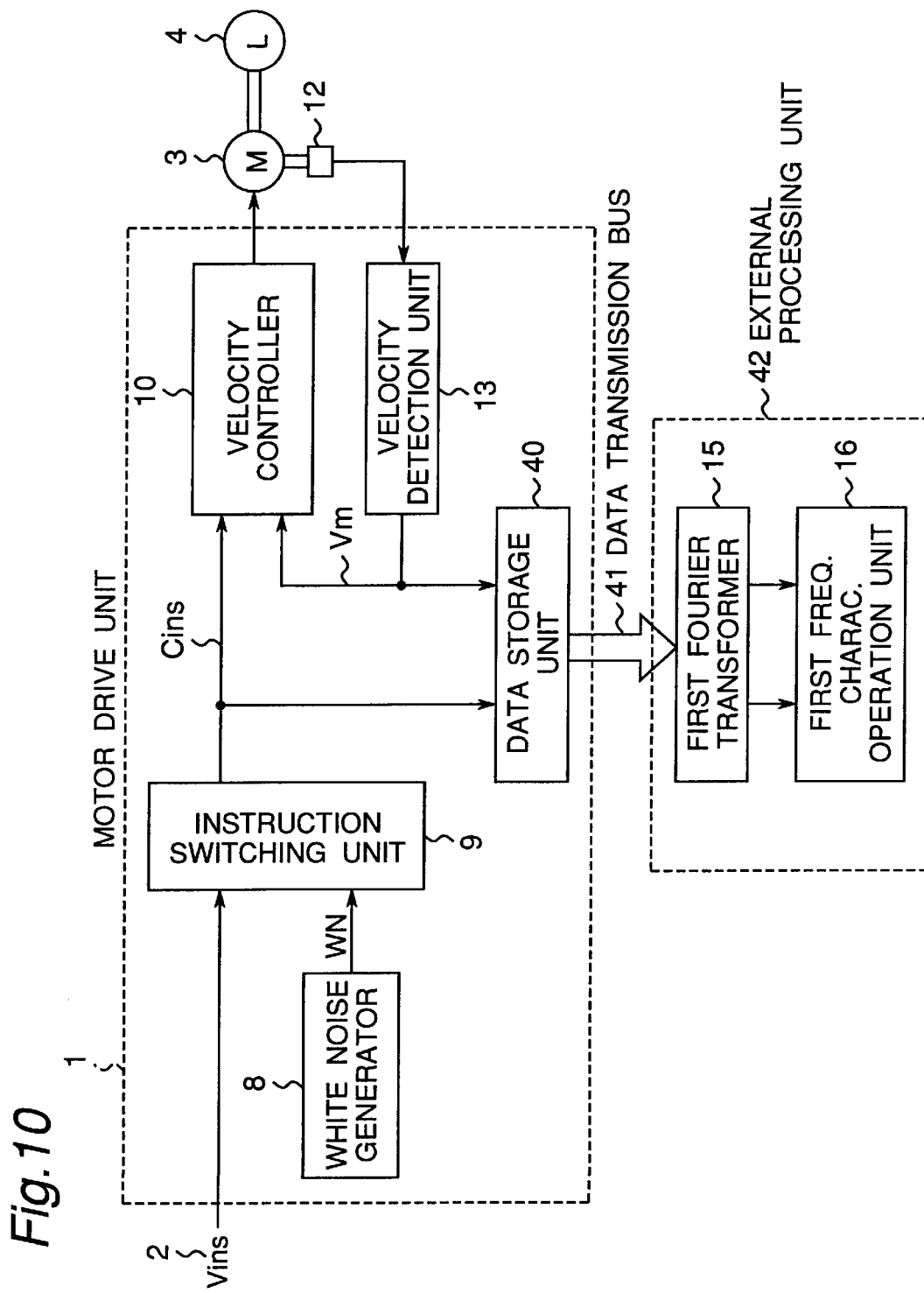
FIG. 10 is a block diagram showing the seventh embodiment of the motor drive control system according to the present invention.

FIG. 10 shows a block construction of the seventh embodiment of the present invention. This construction is substantially the same as that of the first embodiment shown in FIG. 1, except that a data storage unit 40 is further provided in the motor drive unit 1 while the first Fourier transformer 15 and the first frequency characteristic operation unit 16 are disposed inside an external processing unit 42. The motor drive unit 1 and the external processing unit 42 are connected by a data transmission bus 41.

In this arrangement, the data of the velocity instruction Cins and the motor velocity Vm are temporarily stored in the data storage unit 40, and thereafter the data read out of the data storage unit 40 is supplied to the first Fourier transformer 15 via the data transmission bus 41 and the output of the first Fourier transformer 15 is supplied to the first frequency characteristic operation unit 16 in the external processing unit 16. In this embodiment, similarly to the first embodiment, the white noise generator 8, velocity instruction switching unit 9, velocity controller 10, velocity detection unit 13 are also disposed inside the motor drive unit 1.

With the above construction, in the operation mode of measuring the frequency characteristics of the motor, the white noise WN selected to be used as the velocity instruction Cins, and then the data of the velocity instruction Cins and the motor velocity Vm are both temporality stored in the data storage unit 40 such as an RAN. In this construction, the velocity instruction Cins is sampled in the data storage unit 40 and the resultant sampled data is simultaneously stored therein. After the measurement of the frequency characteristics is terminated, the data of the velocity instruction Cins and the motor velocity Vm are retrieved from the data storage unit 40 and supplied to the first Fourier transformer 15 via the data transmission bus 41. The other operations are the same as those in the first embodiment and the explanation thereof is omitted here for brevity.

As already described, as the sampling period of the velocity instruction Cins and the motor velocity Vm is shortened, the frequency characteristics in a higher frequency band are obtained. In general, Fourier transform is a time-consuming arithmetic processing. Therefore, if it is desired to obtain the frequency characteristics in a high frequency band, the Fourier transform processing is not performed in time. For example, in order to obtain the frequency characteristics up to 1 KHz, the sampling period should be made one-fourth of the period (i.e., 1 mili-sec) corresponding to the frequency 1 KHz, namely, 250 μsec of the sampling period is required at the least. Whereas, the Fourier transform processing time is much larger in order than that of the sampling period.

In this embodiment, however, even if the sampling period is shortened as desired for obtaining a higher frequency band, the difference in the processing time can be absorbed by temporality storing the data of the velocity instruction Cins and the motor velocity Vm in the data storage unit 40.

Furthermore, since the Fourier transform and the frequency characteristics operation are performed in the external processing unit 42 such as a personal computer independent from the motor drive unit 1, the processing of the motor drive unit 1 can be reduced. Frequency characteristics are easily recognizable by graphic representation such as a Bode diagram, and further can be analyzed more easily if the graph is subjected to smoothing processing to eliminate a noise component. It is however difficult for the motor drive unit 1 to perform such processing due to its short processing capability and lack of an indicator. On the contrary, the construction of this embodiment can easily realize this processing, where the graph representation processing can be executed by the external processing unit 42.

The construction of this embodiment can also be applied to the measurement of the loop transfer characteristics under velocity control described in the second and third embodiments and to the measurement of the response characteristics under position control described in the sixth embodiment by changing the data handled by the data storage unit 40 and the data transmission bus 41 to the position instruction data, the velocity deviation, and the like.

(Embodiment 8)

Figure 11:
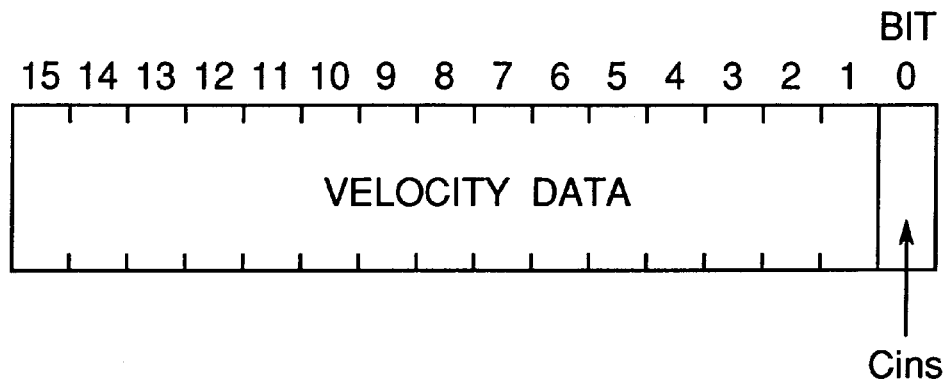
FIG. 11 is an explanatory view showing a data construction in the eighth embodiment.
Figure 12:
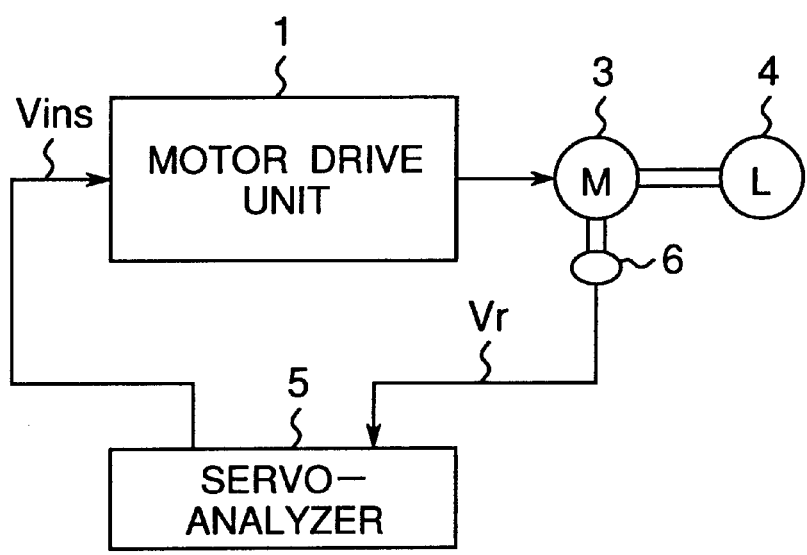
FIG. 12 is a block diagram illustrating a conventional motor drive control system.
Figure 13:
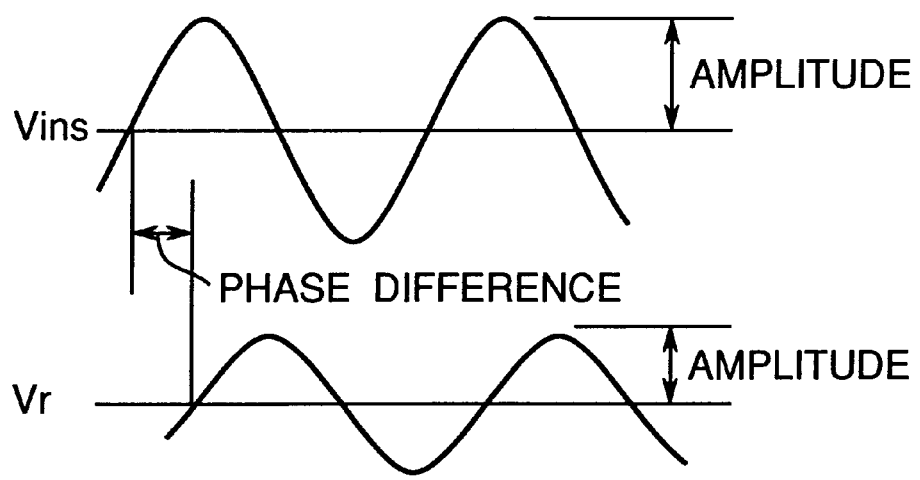
FIG. 13 is a view for explaining the operation of the conventional motor drive control system.

FIG. 11 shows a data structure of the data handled by the data storage unit 40 and the data transmission bus 41 in the eighth embodiment of the present invention, and the other construction of this embodiment is substantially the same as that of the seventh embodiment shown in FIG. 10.

In this embodiment, the M-sequence signal of binary data is used as the white noise signal generated by the white noise generator 8. Accordingly, assuming that W represents the white noise which is used as the velocity instruction Cins when the frequency characteristics are measured, using reference signal data REF which is 0 or 1, amplitude AMP and offset OFS of the white noise W, the white noise W can be represented as an equation of W=(2×REF−1)×AMP+OFS. In this equation, since the amplitude AMP and the offset OFS are constant, the white noise W used as the velocity instruction Cins can be reproduced based on the data of the amplitude AMP and the offset OFS by storing only the reference signal data REF of the velocity instruction Cins in the data storage unit 40 when sampling the velocity instruction Cins in the operation of measuring the frequency characteristics.

Utilizing this fact, the structure of the data handled by the data storage unit 40 and the data transmission bus 41 is constructed as composite data as shown in FIG. 11, where bit 0, i.e., LSB is allocated for the reference signal data REF of the velocity instruction Cins and the remaining more significant bits are allocated for the data of the motor velocity Vm. The composite data is received by the external processing unit 42 and then separated to reproduce the white noise W as the velocity instruction Cins.

According to the present embodiment, since the two different data of the velocity instruction Cins and the motor velocity Vm are unified into one composite data, the data amount can be halved. This makes it possible to halve the storage capacity of the data storage unit 40 and thus remarkably reduce the time required for data transfer from the motor drive unit 1 to the external processing unit 42.

In this data construction, LSB is allocated for the reference signal data REF of the velocity instruction Cins and the remaining more significant bits are allocated for the motor velocity Vm. This is because the reference signal data REF can be retrieved by masking the more significant bits and the data of the motor velocity Vm can be retrieved by arithmetically right shifting, which can be easily performed without destroying codes of the data of the motor velocity Vm. However, the allocation is not specifically limited to the above construction. Moreover, the white noise may also be any binary signal other than the M-sequence signal. The construction of this embodiment is also applicable to the measurement of the frequency characteristics under position control by using position data in place of the velocity data.

As is evident from the embodiments described above, according to the first aspect of the present invention, a motor drive control system in which a motor drive unit receives an input drive control instruction signal (Vins, Pins) to drive a motor and a load connected thereto under controlling the motor drive, said motor drive control system comprises: a white noise generation means generating a white noise (WN); an instruction selecting means for selecting one of the input drive control instruction signal for normal control operation and the white noise generated by the white noise generation means for frequency characteristic operation, as a control instruction data signal (Cins); a control means controlling a motor drive using the control instruction data signal (Cins) output of said instruction selecting means (9, 33); a sampling means (13, 36) sampling data representing a driving state of one of the motor and the load at a predetermined sampling period to generate sampled data (Vm, Pm); a first Fourier transform means (15, 22, 38) for Fourier-transforming the control instruction data (Cins) output of said instruction selecting means (9, 33) together with the sampled data (Vm, Pm) obtained by said sampling means (13, 36); and a first frequency characteristic operation means (16, 23, 39) for calculating frequency characteristics in a range from the control instruction data (Cins) to the sampled data (Vm, Pm) based on output data of said first Fourier transform means.

Alternatively, in this construction, the motor drive unit receives a velocity instruction signal (Vins) as the input drive control instruction signal and the control instruction data signal (Cins) is a velocity control instruction data signal, and said sampling means samples a real velocity of one of the motor and the load to generate the sampled velocity data (Vm), whereby the velocity control instruction data and the sampled velocity data (Vm) are supplied to said first frequency characteristic operation means (16, 23) via said first Fourier transform means (15, 22).

By this arrangement, since the construction for calculating the frequency characteristics is included in the motor control unit, the frequency characteristics of the motor with a load connected thereto can be simply obtained without the necessity of a special instrument such as a servo-analyzer. Moreover, since the white noise containing all frequency components in uniform is used as the velocity instruction, measurement of the frequency characteristics can be performed in a short time, whereby the burdens affected on the motor and the load can be minimized.

According to the second aspect of the present invention, the motor control system further comprises: a velocity deviation operation means (17) for calculating a difference between the velocity control instruction data (Cins) and the sampled motor velocity data (Vm) to generate a velocity deviation (Vd); a second Fourier transform means (19) for Fourier-transforming the velocity control instruction data (Cins) and the velocity deviation (Vd) obtained by said velocity deviation operation means; a second frequency characteristic operation means (20) for calculating frequency characteristics in a range from the velocity control instruction data (Cins) to the velocity deviation (Vd) based on output data of said second Fourier transform means (19); and a third frequency characteristic operation means (21) for calculating frequency characteristics of a loop transfer function under velocity control based on output results of said first frequency characteristics operation means (16) and second frequency characteristics operation means (20).

By this arrangement, the frequency characteristics of a loop transfer function can be obtained under a velocity-controlled state by only adding a few components to the construction of the first aspect, and thus can be utilized in determining stability of the control and examining in detail resonance characteristics of the load and the like.

According to the third aspect of the present invention, the motor control system further comprises a deviation operation means (17) for calculating a difference between the control instruction data (Cins) and the sampled data (Vm, Pm) to generate deviation data (Vd), and said first Fourier transform means (22) Fourier-transforms the deviation data (Vd) obtained by said deviation operation means (17) and the sampled data (Vm) obtained by said sampling means (13), and said first frequency characteristic operation means (23) calculates frequency characteristics of a loop transfer function in a range from the deviation data (Vd) to the sampled data (Vm, Pm) based on the output data of said first Fourier transform means (22).

By this arrangement, the frequency characteristics of a loop transfer function under velocity control can be obtained with a simpler construction than that of the second aspect.

According to the fourth aspect of the present invention, the motor drive control system further comprises: a response frequency detection means (24) detecting a response frequency (Rf) based on the frequency characteristics obtained by said first frequency characteristics operation means (16, 23, 39); and an inertia presumption means (26) operating presumption of inertia based on a control gain value (K) of said control means (10, 34) and the response frequency (Rf) obtained by said response frequency detection means (24).

By this arrangement, since the motor drive unit is provided with a response frequency detection unit, it is possible to presume inertia of the motor and that of the load from the relationship among the inertia, control gain value, and response frequency.

According to the fifth aspect of the present invention, the motor drive control system further comprises: a resonance frequency detection means (28) for detecting a resonance frequency based on the frequency characteristics obtained by said first frequency characteristics operation means (16, 23, 39); and a notch filter characteristic setting means (30) for setting characteristics of a notch filter (31) included in said control means (10, 34) based on the resonance frequency obtained by said resonance frequency detection means (28).

By this arrangement, the characteristics of the notch filter is automatically set so that the notch frequency matches with the detected resonance frequency, a frequency component which may excite resonance is eliminated from a torque driving the motor, resulting in suppressing resonance.

According to the sixth aspect of the present invention, the motor drive unit (1) receives a position instruction signal (Pins) as the input drive control instruction signal and the control instruction data signal (Cins) is a position control instruction data signal, and said sampling means (13) samples real position data of one of the motor and the load to generate the sampled position data (Pm), whereby the position control instruction data and the sampled position data (Pm) are supplied to said first frequency characteristic operation means (39) via said first Fourier transform means (38).

By this arrangement, the position instruction response characteristics of the motor with the load connected thereto can be simply measured without the necessity of a special instrument.

According to the seventh aspect of the present invention, the motor drive unit (1) further comprises a data storage means (40) for contemporarily storing the control instruction data (Cins) output of said instruction selecting means (9, 33) together with the sampled data (Vm, Pm) obtained by said sampling means (13, 36), wherein said first Fourier transform means (15, 22, 38) and said first frequency characteristic operation means (16, 23, 39) are disposed inside an external processing unit (42) independent of the motor drive unit, and wherein the motor drive unit and the external processing unit are connected via a data transmission bus means (41).

By temporarily storing data in the data storage unit, even when the sampling period of velocity data is shortened, the processing of Fourier transform can be performed in time. Moreover, the processing of the motor drive unit can be reduced by the construction where the Fourier transform and the frequency characteristics operation are performed in the external processing unit independent from the motor drive unit.

According to the eighth aspect of the present invention, the white noise output of said white noise generation means (8) is a binary data signal, and at least one of the data stored in said data storage means (40) and the data transmitted by said data transmission bus means (41) is of a composite data structure where one bit of the data is allocated for the control instruction data (Cins) and the remaining bits are allocated for the sampled data (Vm, Pm) obtained by said sampling means (13, 36).

By this arrangement, since the two data of the velocity instruction and the sampled velocity, or of the position instruction and the sampled position, are unified into one composite data, the data amount can be halved, which makes it possible to halve the storage capacity of the data storage unit and thus reduce the time of data transfer from the motor drive unit to the external processing unit.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A motor drive control system in which a motor drive unit receives an input drive control instruction signal to drive a motor and a load connected thereto under controlling the motor drive, said motor drive control system comprising:
    a white noise generator generating a white noise;
    an instruction selecting unit for selecting one of the input drive control instruction signal for normal control operation and the white noise generated by the white noise generator for frequency characteristic operation, as a control instruction data signal;
    a controller controlling a motor drive using the control instruction data signal output of said instruction selecting unit;
    a sampling unit sampling data representing a driving state of one of the motor and the load at a predetermined sampling period to generate sampled data;
    a first Fourier transformer for Fourier-transforming the control instruction data output of said instruction selecting unit together with the sampled data obtained by said sampling unit; and
    a first frequency characteristic operation unit for calculating frequency characteristics in a range from the control instruction data to the sampled data based on output data of said first Fourier transformer.

2. The motor drive control system as claimed in claim 1, wherein the motor drive unit receives a velocity instruction signal as the input drive control instruction signal and the control instruction data signal is a velocity control instruction data signal, and said sampling unit samples a real velocity of one of the motor and the load to generate the sampled velocity data, whereby the velocity control instruction data and the sampled velocity data are supplied to said first frequency characteristic operation unit via said first Fourier transformer.

3. The motor control system as claimed in claim 2, further comprising:
    a velocity deviation operation unit for calculating a difference between the velocity control instruction data and the sampled motor velocity data to generate a velocity deviation;
    a second Fourier transformer for Fourier-transforming the velocity control instruction data and the velocity deviation obtained by said velocity deviation operation unit;
    a second frequency characteristic operation unit for calculating frequency characteristics in a range from the velocity control instruction data to the velocity deviation based on output data of said second Fourier transform unit; and
    a third frequency characteristic operation unit for calculating frequency characteristics of a loop transfer function under velocity control based on output results of said first frequency characteristics operation unit and second frequency characteristics operation unit.

4. The motor control system as claimed in claim 1, further comprising a deviation operation unit for calculating a difference between the control instruction data and the sampled data to generate deviation data, and said first Fourier transformer Fourier-transforms the deviation data obtained by said deviation operation unit and the sampled data obtained by said sampling unit, and said first frequency characteristic operation means calculates frequency characteristics of a loop transfer function in a range from the deviation data to the sampled data based on the output data of said first Fourier transformer.

5. The motor drive control system as claimed in claim 1, further comprising: a response frequency detection means detecting a response frequency based on the frequency characteristics obtained by said first frequency characteristics operation unit; and an inertia presumption unit operating presumption of inertia based on a control gain value of said controller and the response frequency obtained by said response frequency detection unit.

6. The motor drive control system as claimed in claim 1, further comprising: a resonance frequency detection means for detecting a resonance frequency based on the frequency characteristics obtained by said first frequency characteristics operation unit; and a notch filter characteristic setting unit for setting characteristics of a notch filter included in said controller based on the resonance frequency obtained by said resonance frequency detection unit.

7. The motor drive control system as claimed in claim 4, further comprising: a resonance frequency detection means for detecting a resonance frequency based on the frequency characteristics obtained by said first frequency characteristics operation unit; and a notch filter characteristic setting unit for setting characteristics of a notch filter included in said controller based on the resonance frequency obtained by said resonance frequency detection unit.

8. The motor drive control system as claimed in claim 1, wherein the motor drive unit receives a position instruction signal as the input drive control instruction signal and the control instruction data signal is a position control instruction data signal, and said sampling unit samples real position data of one of the motor and the load to generate the sampled position data, whereby the position control instruction data and the sampled position data are supplied to said first frequency characteristic operation unit via said first Fourier transformer.

9. The motor drive control system as claimed in claim 1, wherein the motor drive unit further comprises a data storage unit for contemporarily storing the control instruction data output of said instruction selecting unit together with the sampled data obtained by said sampling unit, wherein said first Fourier transformer and said first frequency characteristic operation unit are disposed inside an external processing unit independent of the motor drive unit, and wherein the motor drive unit and the external processing unit are connected via a data transmission bus.

10. The motor drive control system as claimed in claim 4, wherein the motor drive unit further comprises a data storage unit for contemporarily storing the control instruction data output of said instruction selecting unit together with the sampled data obtained by said sampling unit, wherein said first Fourier transformer and said first frequency characteristic operation unit are disposed inside an external processing unit independent of the motor drive unit, and wherein the motor drive unit and the external processing unit are connected via a data transmission bus.

11. The motor drive control system as claimed in claim 9, wherein the white noise output of said white noise generator is a binary data signal, and at least one of the data stored in said data storage unit and the data transmitted by said data transmission bus is of a composite data structure where one bit of the data is allocated for the control instruction data and the remaining bits are allocated for the sampled data obtained by said sampling unit.

* * * * *